UNITED STATES PATENT OFFICE.

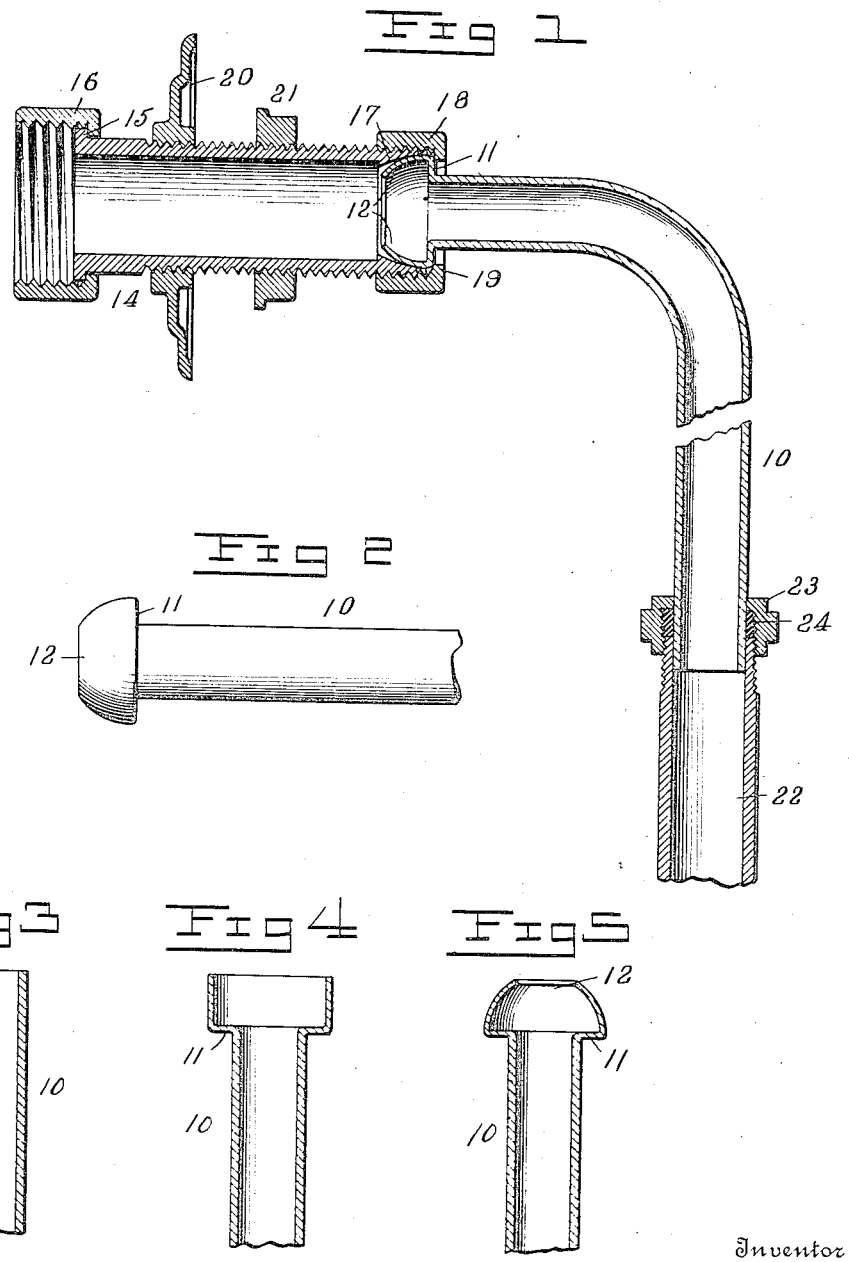

ANTON C. SCHUERMANN, OF DECATUR, ILLINOIS, ASSIGNOR TO THE H. MUELLER MANUFACTURING COMPANY, OF DECATUR, ILLINOIS, A CORPORATION OF ILLINOIS.

SUPPLY-PIPE FOR LAVATORY-FITTINGS.

1,017,813.   Specification of Letters Patent.   Patented Feb. 20, 1912.

Application filed July 21, 1910. Serial No. 573,127.

*To all whom it may concern:*

Be it known that I, ANTON C. SCHUERMANN, a citizen of the United States, residing at Decatur, in the county of Macon and State of Illinois, have invented new and useful Improvements in Supply-Pipes for Lavatory-Fittings, of which the following is a specification.

My present invention relates to certain new and useful improvements in supply pipes and detachable joint connections therefor especially designed for association with lavatory fittings such as bath and basin cocks, although the invention is not limited to this particular use as the pipe member with its improved annular shoulder and tapering or conical seating end will be found to be serviceable in other connections.

In plumbing work especially, it has been the practice heretofore to employ a supply pipe having a conical or tapered projection at or near one end to fit into a conical seat formed in the member to which the supply pipe is attached and there is a shoulder in rear of this conical or tapered projection with which shoulder the coupling nut employed to hold the parts together engages. In some cases, as where the supply pipe is composed of a relatively thin metal tube, the conical or tapered projection has been in the form of a separate and removable soft metal gasket fitted upon the end of the pipe in advance of a collar fixed to said pipe; and in other cases, as where a tail-piece is employed in connection with the supply-pipe, the said tail-piece has been made of cast metal and has its tapered or conical projection cast integral therewith, forming with its associated seat, what is known as a ground joint. Both of these types of supply-pipes and their joint connections are more or less objectionable in that they are expensive to manufacture; they require the several parts of which they are comprised to be assembled before the joint can be made, and in many instances, it is difficult, and sometimes impossible, to make a perfectly fluid-tight joint.

It is the purpose of the present invention to obviate the foregoing and other objectionable features present in the prior constructions and to provide a pipe section or supply member of the character described that will be simple in construction, comparatively cheap to manufacture and one wherein a perfectly fluid-tight joint may be readily made with its associated connecting member and without employing the usual separate lead or other cone gaskets or washers.

Briefly and generally stated the invention resides in a new and useful unitary article of manufacture capable of universal application to existing plumbing installations, and comprises a pipe section or supply member formed of a relatively thin metal tube having a portion thereof near one end expanded laterally in all directions to provide an annular shoulder near such end, the metal of the tube in advance of the shoulder being tapered to form a conical end seating portion or extremity the wall of which is arched or convex in cross-section and adapted to fit into and make line contact with an outwardly flaring seat formed as an extension of the passage through the associated member, which latter may be a faucet-shank or other lavatory fitting, and the mean diameter of said conical end portion or extremity being greater than the diameter of the tube.

In the accompanying drawing, which, it will be understood, is merely illustrative of one embodiment of the invention; Figure 1, is a sectional elevation of one form of my invention shown associated with the shank of a bath-cock. Fig. 2, is an elevation of the invention shown disconnected. Figs. 3, 4 and 5, are vertical sectional views showing respectively the metal tube in the rough and the subsequent steps in the process of forming the annular shoulder and the tapered or conical seating end in advance thereof.

Referring to the drawing the reference numeral 10, designates a pipe section which in the instance shown in Fig. 1 is in the form of a supply-pipe associated with the shank of a lavatory fitting, such as a bath-cock. The pipe-section is formed of a relatively thin seamless metal tube, and preferably a drawn metal tube, because of the fact that in some instances the tube is required to be bent at certain points; because of its great tensile strength; because it is susceptible of better finish, (these pipes being usually employed in what is known as "open" plumbing and therefore are highly polished) and furthermore because a drawn metal tube may be more quickly and cheaply worked and shaped as required in connection with the purposes of this invention. Near one end of the said pipe section the metal of the tube is expanded laterally in all directions to provide an annular shoulder 11, and in advance of said shoulder there is an enlarged tapered or conical end or seating portion 12, which is formed by compressing the metal at the end portion of the tube from the shoulder forward to its extremity, the mean diameter of said conical or seating portion being greater than the diameter of the tube and the annular wall of which is arched or convex in cross-section. It will thus be seen that the tapered or conical seating portion is formed as an integral part of the tube and is formed from the metal wall of the tube itself, which metal wall during the expanding operation is drawn somewhat thinner than the body of the tube and is therefore slightly yielding so that it will the more readily conform to and closely fit the outwardly flaring seat in the member with which it is associated.

The annular shoulder 11, and the tapered or conical seating portion 12, may be easily, quickly and cheaply formed by means of dies and in the process of manufacture I first take an ordinary seamless drawn metal tube or pipe section as shown in Fig. 3, and by means of suitable dies expand one end thereof until it assumes substantially the shape illustrated in Fig. 4, and then by means of other dies the wall of the tube at its extremity in advance of the annular shoulder 11, is drawn inward or contracted to form the tapered or conical projection 12, as shown in Fig. 5. These operations may be carried on with ease and rapidity and inasmuch as the shoulder and tapered or conical portion are formed by dies they will be absolutely uniform and will require no further finishing to make them smooth and shapely. The opposite end of the pipe-section or tubular supply member 10, when it is furnished as an article of manufacture may be provided with threads to receive a coupling nut or it may be left smooth, as when it is telescoped at said end into a service pipe and connected by means of the well known " slip " joint coupling nut as shown in Fig. 1.

When my improved pipe-section is made in the form of a supply-pipe and designed for connection with a bath cock it is usually made in the form of an elbow as shown in Fig. 1. In this figure the reference numeral 14 designates a faucet-shank screw-threaded for a part of its length and having a collar 15, at one end which serves as a stop for a coupling nut 16, said nut serving as the means for coupling a bath-cock or faucet to the shank. The rear end of the shank is preferably provided with an internal outwardly flaring or tapered seat 17, which seat is formed as an extension of the wall of the opening through the pipe and into which the yielding and conical or tapered projection 12 of the pipe section or supply member 10, is fitted with its convex wall in facial contact with the said flaring seat 17 and the connection is made by means of a coupling nut 18, the flange 19, of which bears against the annular shoulder 11, on the pipe-section 10, and by screwing the said nut home upon the shank 14, the arched or convex wall of the conical projection 12 will be drawn up tightly making what I have termed a " line " contact against the tapered seat 17 in the shank, resulting in a fluid tight joint being made without the aid of a separate packing ring or washer as heretofore usually employed. If the shank 14 is passed through an aperture in a bath tub or other lavatory receptacle, said shank will be provided with an adjustable flange 20, and a lock-nut 21, these said members being threaded upon the shank. As before stated, it will also be seen, by referring to the drawing, that the seat-engaging wall of the head or seating portion 12, is arched or convex in cross-section so that it may be readily brought into fluid-tight seating engagement with the flaring or tapered wall 17, of a faucet shank or other member, the contact between these two members being, what may be termed, a " line " contact, and inasmuch as the wall of the head 12, is relatively long and arched or convex in cross-section, it may be brought into seating engagement with outwardly flaring seats of different diameters, and the coupling pipe may, therefore, be said to be of universal application.

In case the lower end of the supply-pipe 10, is smooth and designed for a telescopic or slip joint connection with a service pipe 22, as shown in Fig. 1, I prefer to employ a coupling nut 23, and a washer 24, which nut is adapted to screw upon the end of the service pipe so as to compress the packing between the nut and the end of the service-pipe in such manner as to make a tight-joint between these parts.

While I have herein illustrated my invention as applied to a supply-pipe for lavatory receptacles, I do not wish to be understood as limiting myself to this specific application except as I may be limited by the terms of the appended claims, as obviously the supply-member or pipe-section constituting the subject-matter of this application may be designed for use in other connections without departing from the spirit of the invention.

What I claim is:

1. As a new article of manufacture, a supply pipe adapted for connection at its opposite ends respectively with a faucet shank and a service pipe, said supply pipe comprising a drawn metal tube having a portion thereof near one end projected laterally in all directions to provide an annular shoulder, the metal of the tube in advance of and adjacent said shoulder being convex in longitudinal section and tapering from the perimeter of the shoulder to the extremity of the tube to provide an annular seat-engaging wall, the mean diameter of which is greater than that of the tube, and the width of which is relatively broad as compared to the extent to which the annular shoulder projects beyond the surface of the tube, whereby said flaring convex wall may make facial contact with an outwardly flaring seating wall formed as an extension of the passage through an associated shank member, and the opposite end of said tube being smooth, whereby a slip-joint connection of greater or less penetration may be made with a service pipe.

2. In a coupling for water and other pipes, a supply pipe composed of a drawn metal tube having a portion thereof near one end projected laterally in all directions to provide an annular shoulder, the metal of the tube in advance of and adjacent the shoulder being convex in longitudinal section and tapering from the perimeter of the shoulder toward the extremity of the tube to provide an annular seat-engaging wall, the mean diameter of which is greater than that of the tube and the width of which is relatively broad as compared to the extent to which the shoulder projects beyond the surface of the tube, the opposite end of said tube being smooth, in combination with a pair of pipe connections, one of which connections has an outwardly flaring internal seat formed as an extension of the passage therethrough and into which the extremity of the tube projects and against which the outer face of the convex wall in advance of the said shoulder makes contact, and into the other of which connections the smooth end of the supply pipe is free to telescope to a greater or less depth, and coupling nuts for coupling the supply pipe at its opposite ends respectively to the said pipe connections.

In testimony whereof I have hereunto set my hand in presence of two subscribing witnesses.

ANTON C. SCHUERMANN.

Witnesses:
WILLIAM R. BIDDLE,
LEONARD F. McKIBBEN.